(No Model.)
E. C. ATWELL.
DISH CLEANER.
No. 575,868. Patented Jan. 26, 1897.
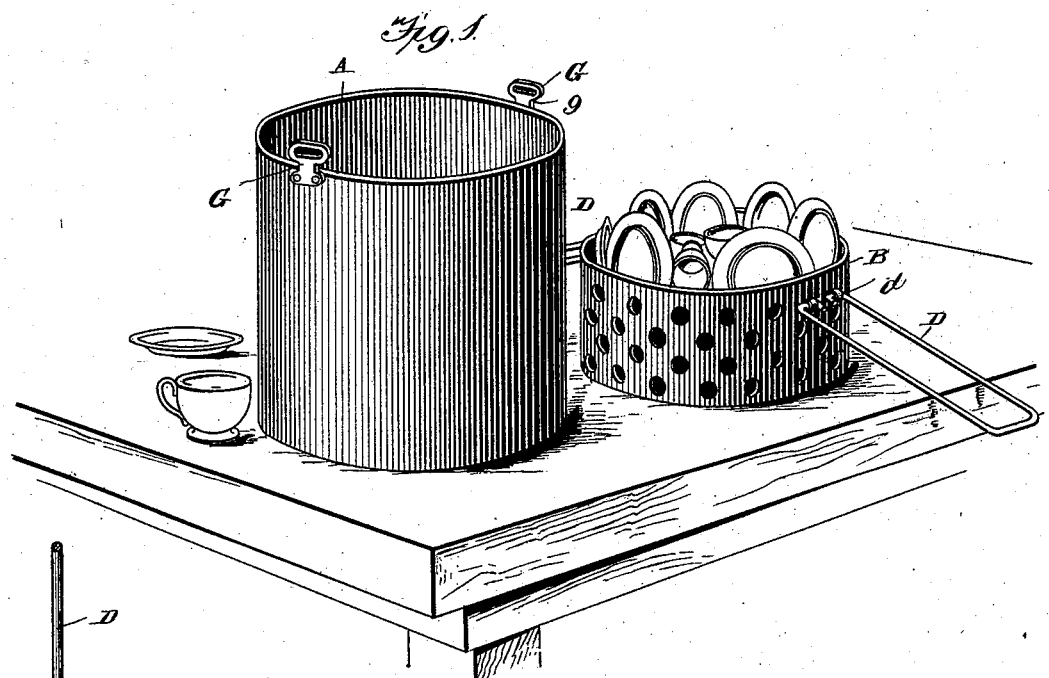
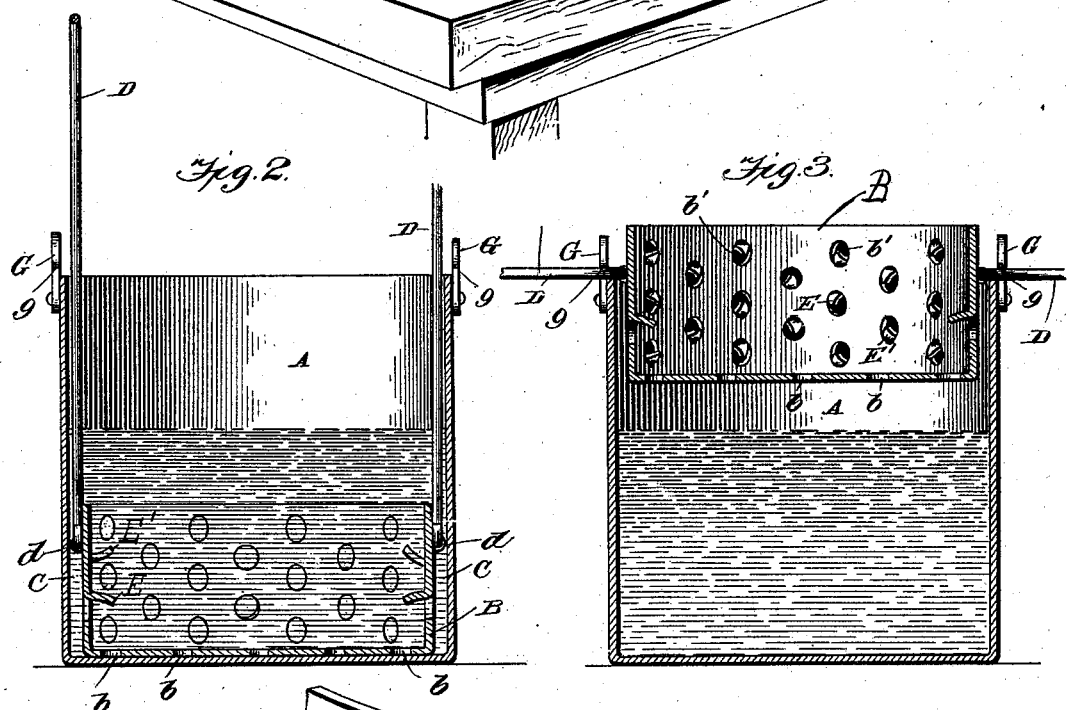
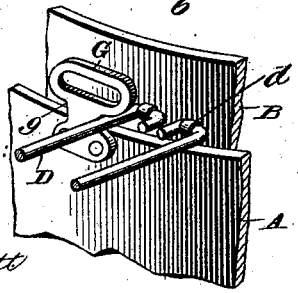
WITNESSES
J. C. Shaw
J. Edw. Luckett
INVENTOR
Evett C. Atwell,
BY
Fred G. Dieterich & Co.
ATTORNEYS

UNITED STATES PATENT OFFICE.

EUELL C. ATWELL, OF ALEXANDRIA, VIRGINIA.

DISH-CLEANER.

SPECIFICATION forming part of Letters Patent No. 575,868, dated January 26, 1897.

Application filed March 20, 1896. Serial No. 584,148. (No model.)

*To all whom it may concern:*

Be it known that I, EUELL C. ATWELL, residing at Alexandria, in the county of Alexandria and State of Virginia, have invented a new and Improved Dish-Washer, of which the following is a specification.

My invention relates to improvements in that class of dish-washing machines having a water-holder and a hand-operated means for moving the dishes through the water by rotary or reciprocating action; and such invention primarily has for its object to provide a machine of this character of a very simple and economical construction, which can be easily manipulated, and which will effectively serve for its intended purposes.

My invention also has for its object to provide a dish-washer having a perforated dish-carrier vertically movable within the water-holder, so arranged relatively to the holder that the water will be forced upward and inward against the dishes by force sufficient to cleanse them in a very quick and positive manner.

My invention also seeks to provide a simple form of handle device for the holder and the carrier whereby the carrier when elevated will be supported by its handles and which will be held locked from accidental displacement by engagement with the holder-handles.

With other objects in view, which will hereinafter appear, the invention consists in the peculiar combination and novel arrangement of parts first described in detail, and then specifically pointed out in the appended claim, reference being had to the accompanying drawings, in which—

Figure 1 is a perspective view illustrating my invention. Fig. 2 is a transverse section of same, the dish-holder being in its lower or plunger position. Fig. 3 is a section view illustrating the holder raised to its draining position. Fig. 4 is a detail perspective view showing the manner of inserting the handles D of the holder beneath the handles G of the outer vessel. Fig. 5 is a detail view illustrating the combined water-deflector members and dish-holders.

My improved dish-washer consists of an outer vessel A, preferably cylindrical in shape and made up of galvanized iron.

B indicates the inner or dish-holding member, of a diameter nearly equal that of the outer vessel, so that when inserted into the said holder A a narrow annular water-space C will be provided between the inner and outer holders B and A.

The holder B is in the nature of a shallow pan and has secured at the sides handle members D D, which extend above the outer body and form the means whereby the inner body can be reciprocated vertically.

The bottom of the holder B is perforated, as at $b$, for the free passage of the water and is also provided with a series of perforations $b'$ in the sides, which perforations preferably have at the edges thereof inwardly-extending deflector members E E', as most clearly shown in Fig. 5. While the members E E' may be omitted and the washer effectively serve its intended purposes, yet I prefer to use the said deflectors, as they also serve to form guards or holders to steady the dishes.

To cause an effective washing and cleansing of the dishes, the deflectors E E' are inclined in reverse directions, so as to throw the current of water-jets in reverse directions and to intermingle.

So far as described it will be readily apparent that by pumping the holder B within the holder A the water will be forced through the bottom of the said holder B and up between such inner and outer holders, where it is compressed and forced through the openings in the side wall of the said holder B in strong jets against the dishes in different directions and with considerable force.

To provide a very simple and effective means for supporting the holder B to a dripping position, the handle members D are preferably made up of a simple stout wire bail hinged to the sides of the holder B, as indicated at $d$, whereby when the said holder is raised to the position shown in Fig. 3 such handles D can be turned down to a horizontal position, and as the bearing will be at a point near their hinged connection such handles will form supports for the holder.

To provide against accidental dropping of the holder B when a heavy load of dishes is held therein, I provide the handles G, secured to the outer holder A, with lateral extensions $g$ $g$, under which the handle members D D are adapted to be turned, as shown in Fig. 4, and be thereby locked from swinging upward until removed from engagement with the said handles.

By providing handle members and means for holding the same locked to their extended position it will be manifest that the dishes can be raised in position to be grasped for drying without the necessity of placing the hands in hot water. Furthermore, as the side of the dish-holder is perforated and provided with deflectors the water-jets will be so forced against the dishes that they can be quickly cleansed by a few manipulations of the dish-holder.

Among other advantages my invention provides for an easy moving of the dishes held within the holder without the danger of breaking or cracking them, which frequently occurs in washers having dish-holders held for rotary or sidewise movement.

Having thus described my invention, what I claim, and desire to secure by Letters Patent, is—

A dish-washer comprising an outer vessel having handle members provided with undercut portions $g$, and a perforated dish-holder movable vertically within the outer vessel and having handle members D, hinged thereto, said handle members adapted to be swung over the upper edges of the outer vessel and adapted to be moved into engagement with the undercut portions of the handle members substantially as shown and described.

EUELL C. ATWELL.

Witnesses:
FRED G. DIETERICH,
JOHN C. SHAW.